United States Patent

[11] 3,566,972

[72] Inventors Felix Aronovich Chernyakov
Dnepropetrouskaya ulitsa, 2a, Kv.19;
Alexandr Petrovich Gurchenko, Ulitsa
Dnepropetrovskaya, 4"g,"kv.55; Timofei
Petrovich Kruglikov, Ulitsa Frunze-
Naberzhnaya, 29,Kv.9; Marat Borisovich
Dynkin, Ulitsa Serova, 15, Kv.26,
Dnepropetrovsk, U.S.S.R.
[21] Appl. No. 716,787
[22] Filed Mar. 28, 1968
[45] Patented Mar. 2, 1971

[54] SENSING UNIT FOR AN AUTOMATIC CONTROL SERVOSYSTEM OF A HARVESTING MACHINE, OPERATING IN ROWS OF CULTIVATED CROP FIELDS
5 Claims, 3 Drawing Figs.
[52] U.S. Cl................................................. 171/8,
56/121.45
[51] Int. Cl.................................................. A01d 25/00
[50] Field of Search.......................................... 171/8;
56/121.45, 121.41, 121.46, (Condition
Responsive Digest); 172/500, 710, 265

[56] References Cited
UNITED STATES PATENTS
770,793    9/1904  Blevins et al................ 56/121.41

| | | | |
|---|---|---|---|
| 1,056,708 | 3/1913 | Nickolai............... | 56/121.46 |
| 3,052,306 | 9/1962 | Lynch................. | 172/500 |
| 3,439,480 | 4/1969 | Burns et al............ | 56/121.4 |
| 3,442,071 | 5/1969 | Duda................... | 56/121.46 |
| 3,183,976 | 5/1965 | Rollins................ | 171/8 |
| 3,326,319 | 6/1967 | Schmidt................ | 171/8 |
| 3,430,723 | 3/1969 | Brooks................. | 56/121.45 |

FOREIGN PATENTS 55,169    4/1967  Germany..................... 56/121.41

Primary Examiner—Antonio F. Guida
Attorney—Waters, Roditi, Schwartz and Nissen

ABSTRACT: A sensing unit is provided for an automatic control servosystem of a harvesting machine operating for example in rows of sugar beets. The unit comprises at least one plant detector which moves below the soil surface, in the top layer thereof, in contact with the root parts of the beets in the ground and a duckfoot is urged by a spring into the ground adjacent the beets and cuts the ground to insure movement of the detector in the upper layer of soil for contact with the root parts. The duckfoot and plant detector are connected by a parallelogram linkage to the harvesting machine and the linkage incorporates a spring which urges the duckfoot against the ground.

SENSING UNIT FOR AN AUTOMATIC CONTROL SERVOSYSTEM OF A HARVESTING MACHINE, OPERATING IN ROWS OF CULTIVATED CROP FIELDS

The present invention relates to sensing units of automatic control servosystems for harvesting machines operating in rows of cultivated crop fields, for example, sugar beet fields.

Known in the art are sensing units for servosystems of harvesting machines operating in rows of cultivated crop fields, said units comprising at least one plant detector and a mounting linkage for fastening it to the frame of the machine (USSR Inventor's Certificate No. 112,185, Cl. 45a, 37).

A disadvantage of these sensing units is in that they rely on the presence of a part of the plant located above the soil surface. As a result, when sugar beet harvesters are used in fields with dead or cutoff haulms and a number of roots not protruding above the surface of the soil, the sensing unit of the servosystem does not have a sensing base along its entire route which considerably impairs the automatic control of the machine.

An object of the present invention resides in providing a sensing unit for an automatic control servosystem of harvesting machines operating in rows of cultivated crop fields, mostly sugar beet fields, said sensing unit feeling the part of the plant located under the surface of the soil, for example the body of a sugar beet root.

In accordance with this object the invention consists in that the sensing unit has a mechanism ensuring the movement of the plant detector through the upper layer of soil.

It is preferable to make the mechanism for moving the plant detector in the upper layer of soil in the form of a duckfoot with a cutting edge, said duckfoot being mounted in front of the plant detector. This mechanism can be provided with a device, pressing it down against the soil.

It is expedient to make the device pressing the mechanism against the soil in the form of a spring one end of which is fastened to one of the plant detector mounting links, the other end being secured to the other link by means of a screw-type tensioning mechanism.

Other objects and advantages of the present invention will become apparent from the detailed description of the invention that follows, and from the appended drawing, wherein.

Figure 1:
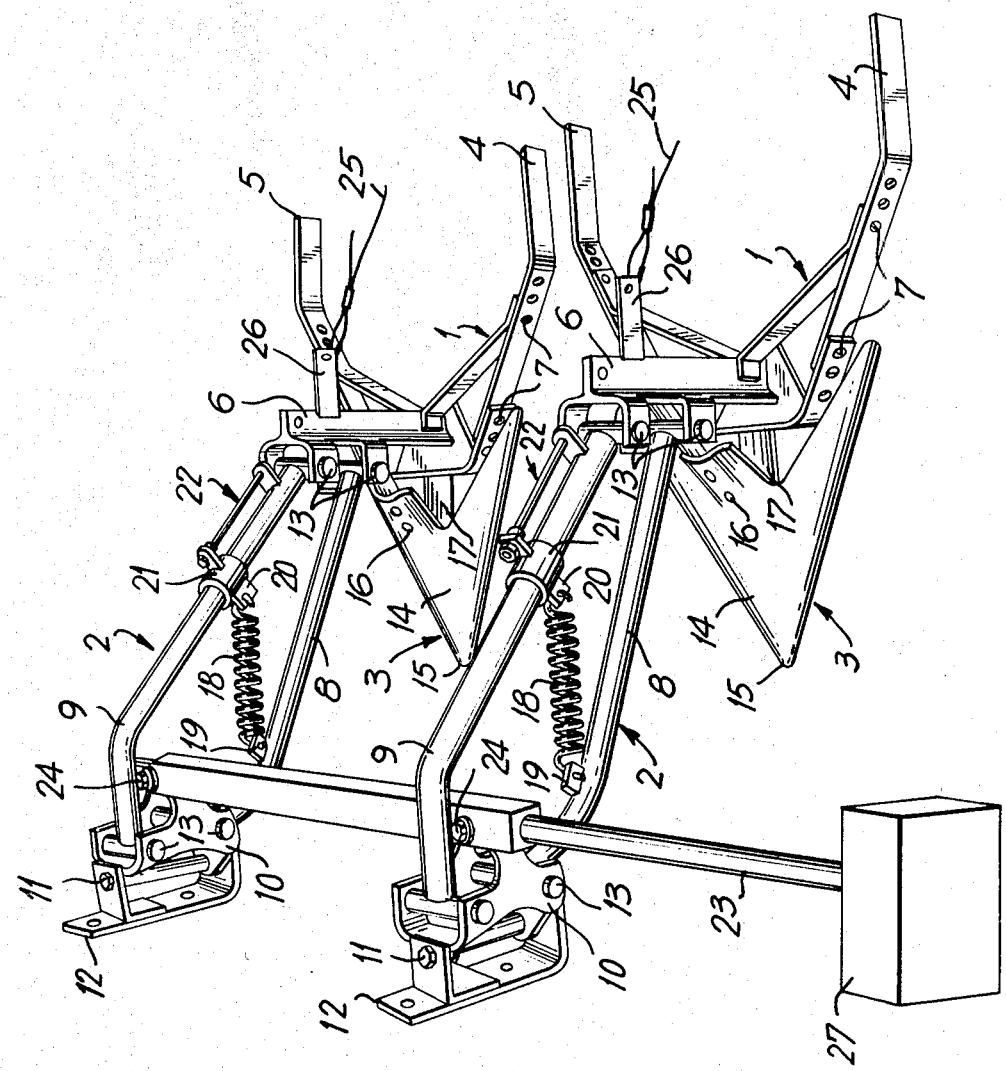
FIG. 1 is a perspective view of two sensing units for a servosystem of a harvesting machine.
Figure 2:
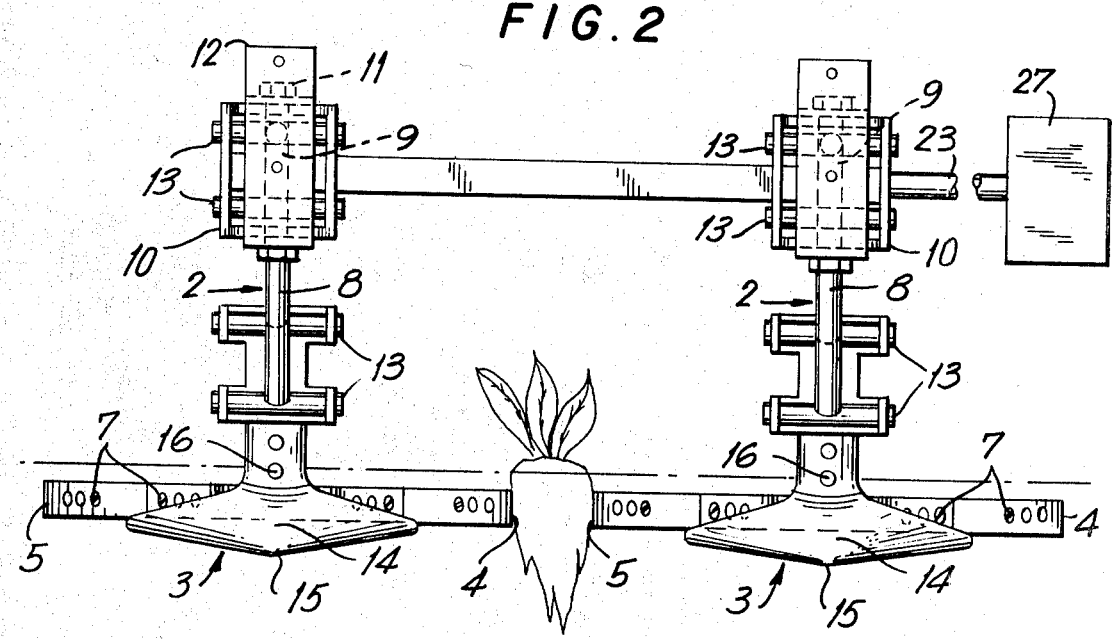
FIG. 2 is a front view thereof.
Figure 3:
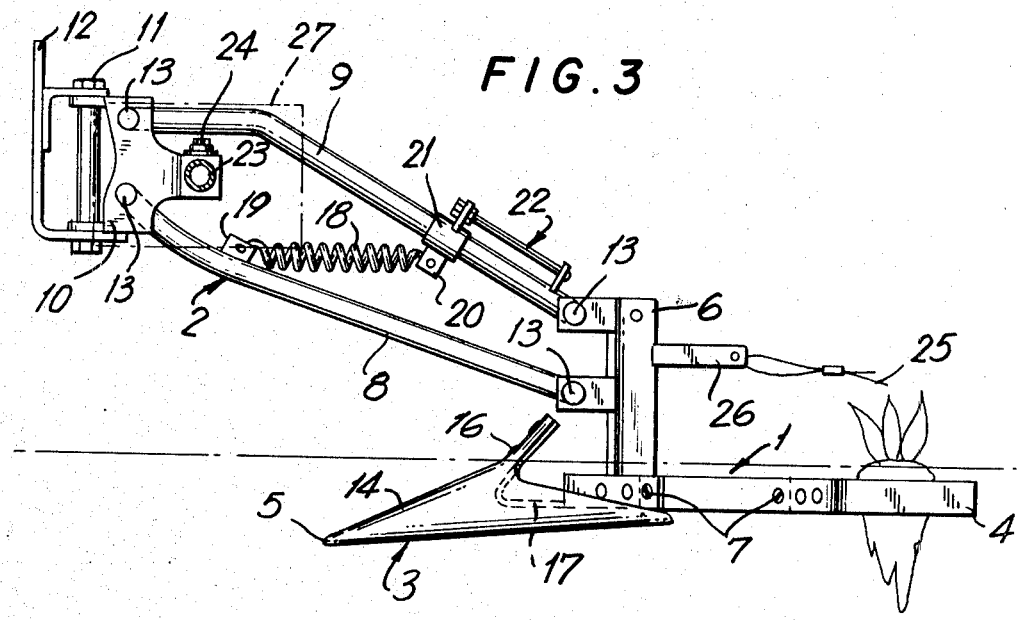
FIG. 3 is a side elevational view thereof.

In describing the present embodiment of the invention, terms in their narrow sense are used for the sake of lucidity. However, the invention is not confined to the narrow sense of the terms used and it will be understood that each of said terms embraces all the equivalent elements functioning similarly and employed for the same purposes.

In fields with the sugar beet roots growing uniformly in a row, in which the spacing between adjacent roots does not increase sharply in excess of the length of the plant detector runners, the servocontrol system can have one sensing unit only; however, since such spacings in the row are a usual occurrence, it is desirable to use two sensing units located in two adjacent row spaces, and moving independently in a vertical direction and synchronously in a horizontal direction.

Each sensing unit comprises a plant detector 1, a mounting linkage 2 for said detector, and a mechanism 3 ensuring the movement of the plant detector 1 in the upper layer of soil.

The plant detector 1 consists of runners 4 and 5 which are parallel to each other in their rear portion and tapering in their front portion, and an upright 6 whose lower part moving in the upper layer of soil carries the runners 4 and 5. The runners 4 and 5 have a plurality of holes 7 for adjusting the position of the runners 4, 5 with respect to the upright 6 thus changing the width of the plant detector 1 to suit the size of the plant roots. The mounting linkage 2 of the plant detector 1 is a hinged four-link member whose links are the upright 6, bent tubes 8 and 9 and a swiveling bracket 10 which is fastened by a vertical pin 11 to a bracket 12. The bracket 12 is secured to the frame of the machine (omitted in the drawing). The bent tubes 8 and 9 are fastened by horizontal pins 13 to the upright 6 and bracket 10.

The mechanism 3 ensuring the movement of the plant detector 1 in the upper layer of soil has the form of a duckfoot 14 with a cutting edge 15. The duckfoot 14 is installed in front of the plant detector 1 being secured by screws 16 to a curved strip 17 of the upright 6. The duckfoot 14 is installed at an acute angle of attack which ensures its self-penetration into the soil.

The mechanism 3 has a device 18 pressing it downwards against the soil. The device 18 comprises a spring, one end of which is fastened to a lug 19 rigidly mounted on the tube 8 and the other end to a lug 20 of a bushing 21, freely mounted on the tube 9 and connected to a screw-type tensioning mechanism 22. The spring 18 develops a constant force urging the duckfoot 14 towards the ground due to the fact that it is extended and located close to the diagonal of the parallelogram linkage 2, i.e., its end attached to the lug 19 is much nearer to the pin 13 in the bracket 10 than the other end attached to the lug 20.

In consequence, when the duckfoot 14 moves upwards and the tubes 8 and 9 accordingly turn around the pins 13, the ends of the spring 18, having different turning radii, cover different distances while moving vertically. As a result, the spring 18 is elongated, generating a component force which urges the duckfoot 14 towards the ground. This component force influences the duckfoot 14, in any position in operation, urging it constantly into the ground.

The sensing units are interconnected by a link 23 articulated to the swiveling brackets 10 by vertical pins 24. The link 23 ensures conjoint movement of the sensing units in a horizontal direction.

The sensing units can be lifted into a transport position by cables 25 connected to lugs 26 of the uprights 6.

The sensing unit for the automatic control servosystem of harvesting machines operating in rows of cultivated crop fields, according to the invention, functions as follows:

As the machine moves along the rows, the duckfoot 14 pressed together with the plant detector 1 against the surface of the soil by the spring 18 penetrates into the soil, deforms its upper layer for a width exceeding that of the duckfoot 14 and draws in the runners 4 and 5 of the adjacent duckfeet 14 which come in direct contact with the parts of the plant root, for example, the sugar beet root, located below the soil surface. The beet roots direct the adjacent plant detectors 1 along the rows, thereby causing lateral movements of the plant detectors with respect to the machine, these movements being transmitted by the link 23 to the control device of the servosystem 27, for example, a hydraulic selector valve, thus putting the system in operation. The system 27 generally, as is well known in the art, serves to steer the harvesting machine to follow the row of beets as shown, for example in Rollins U.S. Pat. No. 3,183,976 and Schmidt U.S. Pat. No. 3,326,319. A thin layer of soil remaining between the 4, 5 of the plant detector 1 and the beet roots protects the latter against damage.

The use of the sensing unit, according to the invention, ensures reliable control of the travel of the agricultural harvesting machines, for example sugar beet harvesters, in the rows of a cultivated crop being harvested due to the direct contact of the plant detectors 1 with the plant roots in the upper layer of the soil.

While a specific embodiment of the invention has been disclosed in the description, it will be understood that various modifications and changes within the spirit and the scope of the invention may occur to those skilled in the art.

These changes and modifications can be resorted to without departing from the scope of the invention as hereinafter defined by the appended claims.

We claim:

1. A sensing unit for an automatic control servosystem of a harvesting machine operating in rows of cultivated crop fields, such as sugar beet fields, said unit comprising at least one plant detector, linkage means mounting said detector on the harvesting machine, and means mounted ahead of said detector and operative therewith for insuring passage of said detector in the upper layer of soil, the latter said means comprising a duckfoot with a cutting edge, and means acting on the duckfoot urging the same into the ground, said detector comprising a runner extending laterally of the duckfoot for sidewise contact with the crops in a row below ground level.

2. A sensing unit as claimed in claim 1 wherein said linkage means comprises a pair of links connected to said detector and the harvesting machine and forming part of a parallelogram linkage, said means urging said duckfoot against the ground comprising a spring having one end attached to one of the links of the linkage and the other end to the other link.

3. A sensing unit as claimed in claim 2 comprising a screw-type tensioning mechanism for said spring connected between said other link and said other end of the spring.

4. A sensing unit as claimed in claim 1 comprising means mounting said duckfoot at an acute angle of attack with respect to the ground.

5. A sensing unit as claimed in claim 1 wherein two of said detectors are provided in adjacent relation, each said detector including a runner facing the runner of the other detector, the crop in a row passing between the runners.